(12) United States Patent
Ma et al.

(10) Patent No.: US 11,286,162 B2
(45) Date of Patent: Mar. 29, 2022

(54) SYSTEM AND METHOD FOR RECOVERING SULFUR IN COPPER SMELTING PROCESS

(71) Applicant: SHANDONG UNIVERSITY, Shandong (CN)

(72) Inventors: Chunyuan Ma, Jinan (CN); Xiao Xia, Jinan (CN); Xiqiang Zhao, Jinan (CN); Tai Feng, Jinan (CN); Jun Li, Jinan (CN); Shizhen Zhang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 235 days.

(21) Appl. No.: 16/613,840

(22) PCT Filed: Aug. 31, 2018

(86) PCT No.: PCT/CN2018/103660
§ 371 (c)(1),
(2) Date: Nov. 15, 2019

(87) PCT Pub. No.: WO2020/024350
PCT Pub. Date: Feb. 6, 2020

(65) Prior Publication Data
US 2021/0331921 A1 Oct. 28, 2021

(30) Foreign Application Priority Data
Aug. 3, 2018 (CN) .......................... 201810879923.7

(51) Int. Cl.
*C01B 17/04* (2006.01)
*B01D 53/50* (2006.01)
(Continued)

(52) U.S. Cl.
CPC ........ *C01B 17/0482* (2013.01); *B01D 53/508* (2013.01); *B01D 53/83* (2013.01);
(Continued)

(58) Field of Classification Search
CPC .. B01D 53/1481; B01D 53/508; B01D 53/81; B01D 53/83; B01D 2253/102; B01D 2257/302; B01D 2258/025
See application file for complete search history.

(56) References Cited

U.S. PATENT DOCUMENTS 9,248,396 B2 * 2/2016 Bouhabila .............. B01D 53/12
9,884,285 B2 * 2/2018 Kupari ................. B01D 53/504
(Continued)

FOREIGN PATENT DOCUMENTS

AU  2013 279 056 A1 *  2/2015  ......... C01B 17/0404
CN     102718194 A     10/2012
(Continued)

OTHER PUBLICATIONS

Apr. 23, 2019 Written Opinion of the International Searching Authority issued in International Patent Application No. PCT/CN2018/103660.
(Continued)

*Primary Examiner* — Timothy C Vanoy
(74) *Attorney, Agent, or Firm* — Oliff PLC

(57) ABSTRACT

A system and method for recovering sulfur in a copper smelting process includes removing fine dust from high-concentration SO₂ flue gas from a matte smelting furnace, introducing the flue gas into a fluidized bed carbothermic reduction tower to be reduced by a carbon-based reducing agent to obtain reducing gas, passing the reducing gas through a high temperature separator to separate down unsaturated powder coke contained in the reducing gas, and condensing the reducing gas to obtain sulfur. The saturated powder coke entrained in the reducing gas enters a desorption tower to desorb SO₂ gas therein, and the desorbed powder coke enters a fluidized bed sulfur reduction tower to continue to participate in the reduction reaction. Part of the SO₂ gas discharged from the desorption tower is discharged (Continued)

to the fluidized bed carbothermic reduction tower to produce sulfur, and the other part enters a desulfurization tower.

14 Claims, 1 Drawing Sheet

(51) Int. Cl.
    *B01D 53/83*     (2006.01)
    *B01D 53/96*     (2006.01)
    *C22B 15/00*     (2006.01)

(52) U.S. Cl.
    CPC ........ *B01D 53/96* (2013.01); *B01D 2253/102* (2013.01); *B01D 2257/302* (2013.01); *C22B 15/0052* (2013.01)

(56) References Cited

U.S. PATENT DOCUMENTS 10,471,388 B2 * 11/2019 Strickroth ................ B01J 21/18
10,518,216 B2 * 12/2019 Ewalts ...................... F27B 1/10

FOREIGN PATENT DOCUMENTS

| CN | 105152138 A | 12/2015 | |
|---|---|---|---|
| CN | 106467293 A | 3/2017 | |
| WO | WO 2014 075 390 A1 * | 5/2014 | ............... C01C 1/24 |
| WO | WO 2015 025 082 A1 * | 2/2015 | ........... B01D 47/022 |

OTHER PUBLICATIONS

Apr. 23, 2019 International Search Report issued in International Patent Application No. PCT/CN2018/103660.

* cited by examiner

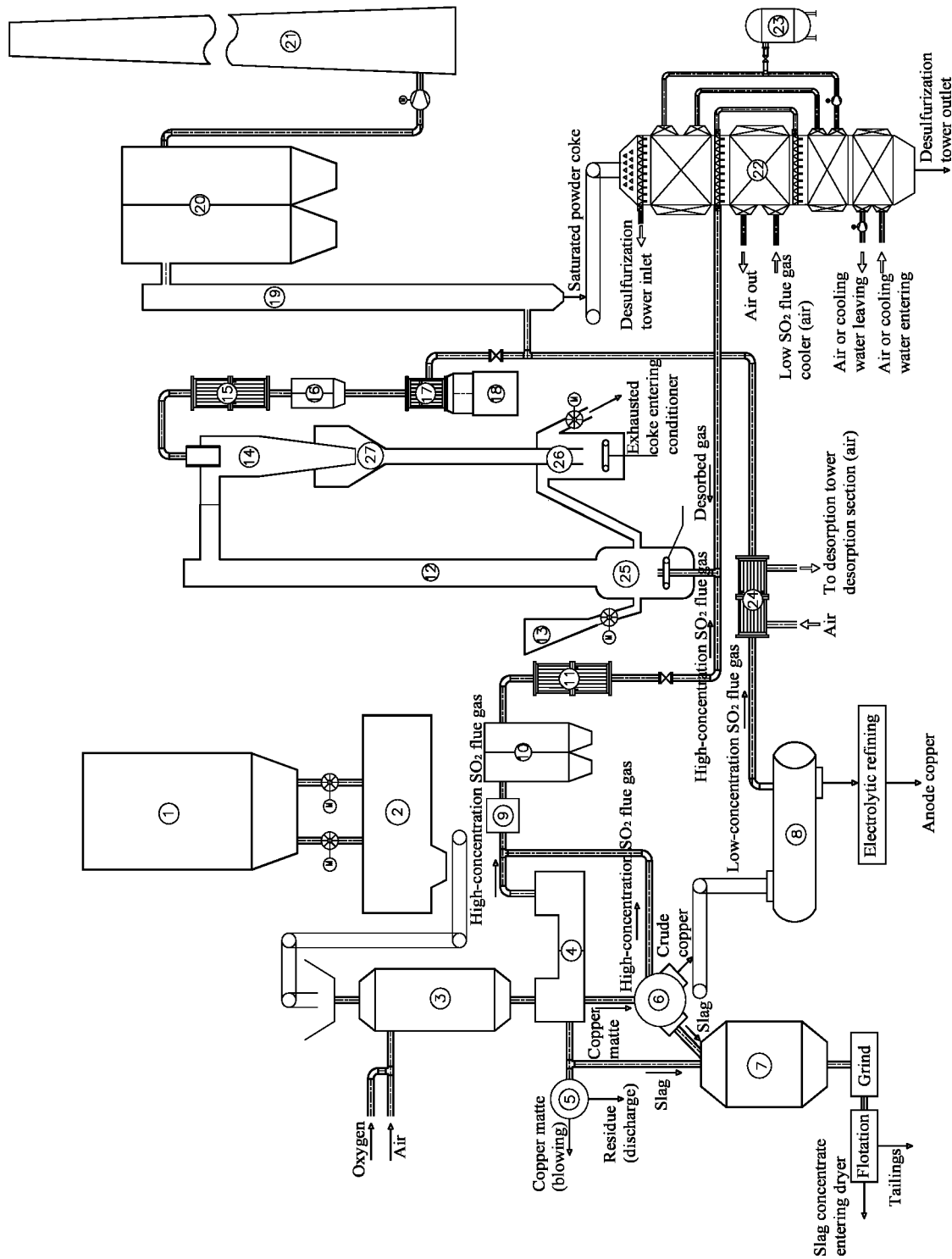

SYSTEM AND METHOD FOR RECOVERING SULFUR IN COPPER SMELTING PROCESS

FIELD OF THE INVENTION

The present invention belongs to the field of sulfur recovery technology, and particularly relates to a system and a method for recovering sulfur in a copper smelting process.

BACKGROUND OF THE INVENTION

In the total production of non-ferrous metals in China, heavy metal copper accounts for a large proportion. As a very important non-ferrous metal, cooper is second only to aluminum in terms of consumption and production. Copper smelting includes pyrometallurgy and hydrometallurgy. Pyrometallurgy is the main method for producing copper. At present, 80% of the world's copper is produced by pyrometallurgy. Particularly, copper sulfide ores are almost treated by pyrometallurgy. The pyrometallurgy for copper sulfide ores has the main advantages of strong adaptability, high smelting speed, capability of fully using sulfur in sulfide ores, and low energy consumption. However, high-concentration $SO_2$ flue gas generated in pyrometallurgy is still difficult to use efficiently, which not only pollutes the environment, but also wastes sulfur resources. With the rapid development of China's scientific and technological level, the copper smelting process has also been greatly upgraded. However, although this upgrade can greatly improve the production of refined copper, it also greatly increases the $SO_2$ concentration of flue gas. The copper smelting process mainly includes four steps: matte smelting, matte converting, fire refining, and electrolytic refining. High-concentration $SO_2$ flue gas having high dust content is produced in the first two steps, the average $SO_2$ concentration is 5-30%, and the highest concentration can reach 40%; low-concentration $SO_2$ having low dust content is produced in the third step, with an average $SO_2$ concentration of 0.5-5%; and flue gas is not produced in the last step.

At present, in the smelting industry of non-ferrous metals, sulfur is generally removed from high-concentration $SO_2$ flue gas by catalytic acid production to recover sulfur resources. The resources are used to prepare sulfuric acid, but the sulfuric acid is difficult to store and transport, and treatment of excessive sulfuric acid is difficult, which is a common problem in the process of handling non-ferrous metal smelting flue gas at present. At the same time, wet desulfurization is mostly used for low-concentration $SO_2$, where the smelting flue gas can reach the standard of discharge, but in this process, not only are water and limestone resources consumed, but also $SO_2$ in the flue gas cannot be effectively utilized, causing waste of sulfur resources. For a copper smelting plant, a set of treatment equipment is required for high-concentration $SO_2$ flue gas and low-concentration $SO_2$ generated in the smelting process respectively, which not only increases the required space, but also greatly increases the investment cost and operating cost. If a process and a device capable of simultaneously processing high-concentration $SO_2$ smelting flue gas and low-concentration $SO_2$ smelting flue gas, and capable of efficiently recovering sulfur in the flue gas to prepare sulfur can be provided, the problem of pollution of $SO_2$ in the smelting flue gas can be effectively solved, the investment and operating costs can be reduced, and shortage of sulfur resources in China can also be alleviated.

Method for Recovering Sulfur from High-Sulfur Flue Gas discloses a method for reducing sulfur dioxide with natural gas; 200910188111.9, Method for Treating High-$SO_2$ and Low-Oxygen Flue Gas in Refinery Plant discloses a method for removing sulfur dioxide by sodium hydroxide, where hydrogen sulfide reacts with sulfur dioxide to produce sulfur.

SUMMARY OF THE INVENTION

In view of the above problems in the prior art, an objective of the present invention is to provide a method for recovering sulfur in a copper smelting process. Active coke with good adsorption and regeneration effects is used to adsorb $SO_2$, and a carbon material is used as the reducing agent to efficiently reduce $SO_2$ to sulfur, thereby realizing the conversion of $SO_2$ to sulfur under minimum external substance input and energy input.

In order to solve the above technical problems, the technical solution of the present invention is: A method for recovering sulfur in a copper smelting process, including the steps of:

1) removing dust first from high-concentration $SO_2$ flue gas from a matte smelting furnace in a settling chamber, mixing the flue gas after dust removal with high-concentration $SO_2$ flue gas from a matte converting furnace, then introducing the mixed flue gas into a conditioner, introducing the conditioned flue gas into a dust removal device to remove dust carried in the flue gas, and then introducing the flue gas into a first flue gas cooler for temperature control;

2) introducing the flue gas after temperature control in the flue gas cooler into a fluidized bed carbothermic reduction tower for oxidation-reduction reaction with a carbon-based reducing agent, performing primary gas-solid separation on the reaction gas obtained in the fluidized bed carbothermic reduction tower through a high-temperature cyclone separator, returning most of the separated carbon-based reducing agent to the reduction tower to continue to serve as a reducing medium, and discharging the other small part of the carbon-based reducing agent that loses the reducing property to the conditioner to react with oxygen in the flue gas so as to remove oxygen from the flue gas;

3) condensing the reaction gas separated by the high temperature separator in a reaction gas cooler, introducing the condensed reaction gas into a dust filter for secondary gas-solid separation to ensure the quality of sulfur recovery, condensing the filtered reaction gas in a sulfur collection device to collect sulfur and storing the sulfur in a sulfur storage tank;

4) cooling the flue gas from a pyro-refining anode furnace first by a second flue gas cooler, then mixing with the reaction gas after sulfur condensation recovery in the sulfur collection device, introducing the mixed flue gas into an active coke desulfurization tower, then removing dust in a dust collector, and discharging the flue gas through a chimney; and 5) feeding the saturated active coke in the active coke desulfurization tower into a desorption tower, and then introducing the desorbed gas into the fluidized bed carbothermic reduction tower for oxidation-reduction reaction with the carbon-based reducing agent therein to recover sulfur.

Preferably, in step 1), the flue gas from the matte smelting furnace and the matte converting furnace is about 1000-1400° C., with the $SO_2$ concentration of 5-30%; the flue gas at the outlet of the conditioner is 1000-1500° C.; and the flue gas at the outlet of the first flue gas cooler is 700-1000° C.

Preferably, in step 2), the temperature of reaction between the flue gas and the carbon-based reducing agent in the fluidized bed carbothermic reduction tower is 700-1000° C., the molar ratio of the carbon-based reducing agent to the $SO_2$ is 10-100, the gas velocity in the tower is 4-8 meters, and the gas-solid contact time in the tower is 2-12 s.

Further preferably, the gas-solid contact time in the tower is 3-6 s, and the molar ratio of the carbon-based reducing agent to the $SO_2$ is 50-100.

Preferably, in step 2), the carbon-based reducing agent has a particle diameter of 60 μm to 3 mm; and the reaction gas obtained after reduction in the fluidized bed carbothermic reduction tower is a mixture of $N_2$, $SO_2$, COS, $H_2S$, $CS_2$, CO, $H_2$, $CO_2$, etc.

Further preferably, the carbon-based reducing agent has a particle diameter of 60 μm to 1 mm.

Preferably, in step 3), the reaction gas separated by the high temperature separator at about 700-1000° C. is condensed in the reducing gas cooler, and the temperature of the condensed reaction gas is about 300-600° C.

Preferably, in step 4), the flue gas from the pyro-refining anode furnace is about 1000-1400° C., with the $SO_2$ concentration of less than 5%; the flue gas from the pyro-refining anode furnace is cooled to 50-130° C. by the second flue gas cooler; and the mixed flue gas is 80-160° C.

Preferably, in step 5), the desorbed gas discharged from the desorption tower is 300-600° C., the $SO_2$ concentration of the desorbed gas is 10-40%, and the desorbed gas is a mixture of $N_2$, $SO_2$, $H_2O$, $CO_2$, etc.

A second objective of the present invention is to provide a system for recovering sulfur in a copper smelting process, including a proportioning bin, a dryer, a matte smelting furnace, a settling chamber, an electric furnace, a matte converting furnace, a slow ash cooler, a pyro-refining anode furnace, a conditioner, a dust collector, a first flue gas cooler, a fluidized bed carbothermic reduction tower, a feed hopper, a high temperature separator, a reducing gas cooler, a fine dust filter, a sulfur recovery device, a sulfur storage tank, a desulfurization tower, a dust collector, a chimney, a desorption tower, a nitrogen making machine, and a second flue gas cooler; the bottom of the proportioning bin is connected to the dryer, the dryer is connected to the matte smelting furnace by a conveyor belt, the lower part of the matte smelting furnace is connected to the settling chamber, and a solid outlet of the settling chamber is connected to the electric furnace, the slow ash cooler, and the matte converting furnace respectively; the matte converting furnace is connected to the slow ash cooler by a pipe and connected to the pyro-refining anode furnace by a crude copper conveyor belt, the flue gas passing through the flue gas pipe is mixed with the flue gas passing through the settling chamber and then the mixed flue gas sequentially passes through the conditioner, the first dust collector and the first flue gas cooler; the flue gas from the first flue gas cooler and the flue gas from the desorption tower are mixed and then introduced into the fluidized bed carbothermic reduction tower, and the reaction gas from the fluidized bed carbothermic reduction tower is sequentially introduced into the high temperature separator, the reducing gas cooler, the fine dust filter, and the sulfur recovery device; the condensed sulfur in the sulfur recovery device is fed into the sulfur storage tank, the flue gas from the pyro-refining anode furnace is introduced into the second flue gas cooler, mixed with the reaction gas at the outlet of the sulfur recovery device and then introduced into the active coke desulfurization tower, dust is removed in the second dust collector, and the flue gas is discharged through the chimney; and the saturated powder coke at the bottom of the active coke desulfurization tower is delivered to the desorption tower by the conveyor belt.

Preferably, a buffer tank is arranged at the bottom of the fluidized bed carbothermic reduction tower, and a fluidizing air nozzle is arranged inside the buffer tank; an ash hopper and a coke storage tank are sequentially connected below the high temperature separator; one side of the buffer tank is connected to the feed hopper, the other side is connected to the coke storage tank below the high temperature separator, and the fluidizing air nozzle is lower than feed ports on two sides of the buffer tank; and an aeration air nozzle is arranged in the coke storage tank.

The newly added carbon-based reducing agent and the circulated carbon-based reducing agent are introduced into the fluidized bed carbothermic reduction tower from two sides of the buffer tank respectively. The buffer tank is provided with the fluidizing air (spouting air) nozzle to establish and maintain the fluidized state of materials during startup and normal operation of devices. The coke storage tank is provided with the aeration air nozzle to ensure that the circulated coke normally enters the buffer tank of the fluidized bed carbothermic reduction tower and the exhausted coke is normally discharged, the circulated coke separated by the high temperature separator enters the coke storage tank through the ash hopper, most of the circulated coke in the coke storage tank is returned to the buffer tank of the fluidized bed carbothermic reduction tower, and the other part enters the conditioner to absorb oxygen in the flue gas.

Preferably, the desorption tower is divided into three sections from top to bottom, respectively a drying and preheating section, a desorption section and a cooling section, a gas discharge device is arranged above each section, the cooling section is divided into an upper cooling section and a lower cooling section, the nitrogen making machine is connected with a heat transfer medium header outside the drying and preheating section and the upper cooling section of the desorption tower, the gas discharge devices are sequentially a first-layer gas discharge device, a second-layer gas discharge device and a third-layer gas discharge device from top to bottom, the third-layer gas discharge device is connected to the second-layer gas discharge device, and the desorbed gas discharged by the second-layer gas discharge device and the flue gas from the first flue gas cooler are mixed and then introduced to the bottom of the fluidized bed carbothermic reduction tower. The nitrogen making machine provides an anti-oxidation medium for the heat transfer medium header at the drying and preheating section and the first cooling section, and the heating medium is heat transfer medium air in the second flue gas cooler. The powder coke entering the desorption tower continuously drops down by means of gravity, the $SO_2$ containing gas desorbed by heating at the desorption section enters the fluidized bed carbothermic reduction tower, and the desorbed powder coke discharged from the bottom of the desorption tower enters the desulfurization tower.

Advantages of the Present Invention

The present invention discloses a process and device for recovering sulfur in a copper smelting process, where a carbothermic reduction tower, an active coke desulfurization tower, an active coke desorption tower and like are used for different concentrations of $SO_2$ flue gas generated in different phases of the copper smelting process, and the conditions of carbothermic reduction reaction, active coke adsorption and active coke desorption are accurately controlled to convert $SO_2$ in the copper smelting flue gas into sulfur for recovery, which not only effectively removes $SO_2$ from the copper smelting flue gas, but also realizes efficient use of sulfur resources. In combination with the conditioning process, wastes generated by the process are treated, and the waste heat of the conditioned flue gas is fully used. Directional conversion of $SO_2$ in the flue gas of the copper smelting process to sulfur can be realized, and better utilization of sulfur resources is proposed with a broad market prospect.

The carbon-based reducing agent in the fluidized bed carbothermic reduction tower has high cycle rate, the conversion rate of $SO_2$ is 90-98%, the yield of sulfur is 85-95%, the purity of the recovered sulfur is more than 99.7%, which is in line with the first grade of industrial sulfur, the $SO_2$ concentration is less than 30 mg/$Nm^3$ and the dust is less than 5 mg/$Nm^3$ at the outlet of the bag-type dust collector.

BRIEF DESCRIPTION OF THE DRAWING

The accompanying drawing constituting a part of the present application is used for providing a further understanding of the present application, and the illustrative embodiments of the present application and the description thereof are used for interpreting the present application, rather than constituting improper limitations to the present application.

FIG. 1 is a process diagram of a system for recovering sulfur in a copper smelting process; In which:

1, proportioning bin; 2, dryer; 3, matte smelting furnace; 4, settling chamber; 5, electric furnace; 6, matte converting furnace; 7, slow ash cooler; 8, pyro-refining anode furnace; 9, conditioner; 10, first dust collector; 11, first flue gas cooler; 12, fluidized bed carbothermic reduction tower; 13, feed hopper; 14, high temperature separator; 15, reducing gas cooler; 16, fine dust filter; 17, sulfur recovery device; 18, sulfur storage tank; 19, active coke desulfurization tower; 20, second dust collector; 21, chimney; 22, desorption tower; 23, nitrogen making machine; 24, second flue gas cooler; 25, buffer tank; 26, coke storage tank; 27, ash hopper; 28, fluidizing air nozzle; 29, aeration air nozzle.

DETAILED DESCRIPTION OF EMBODIMENTS

It should be pointed out that the following detailed descriptions are all exemplary and aim to further illustrate the present application. Unless otherwise specified, all technological and scientific terms used herein have the same meanings generally understood by those of ordinary skill in the art of the present application.

It should be noted that the terms used herein are merely for describing specific embodiments, but are not intended to limit exemplary embodiments according to the present application. As used herein, unless otherwise explicitly stated by the context, the singular form is also intended to include the plural form. In addition, it should also be appreciated that when the terms "include" and/or "comprise" are used in the description, they indicate features, steps, operations, devices, components and/or their combination.

The following further describes the present invention in combination with embodiments.

Embodiment 1

1) Flue gas from a matte smelting furnace and a matte converting furnace is about 1100° C., with the $SO_2$ concentration of 10%, dust is removed first from high-concentration $SO_2$ flue gas from the matte smelting furnace in a settling chamber, the flue gas after dust removal is mixed with high-concentration $SO_2$ flue gas from the matte converting furnace, then the mixed flue gas is introduced into a conditioner, the temperature of the conditioned flue gas rises to 1100° C., the conditioned flue gas is introduced into a dust removal device to remove dust carried in the flue gas and then introduced into a first flue gas cooler for temperature control, and the flue gas cooler controls the temperature of the flue gas to 800□;

2) The flue gas after temperature control in the flue gas cooler is introduced into a fluidized bed carbothermic reduction tower for oxidation-reduction reaction with a carbon-based reducing agent, where the carbon-based reducing agent has a particle size of 80 μm, the reaction temperature is 800□, the molar ratio of $C/SO_2$ is 50, the gas velocity in the tower is 5 meters, and the gas-solid contact time in the tower is 5 s; primary gas-solid separation is performed first on the reaction gas obtained in the fluidized bed carbothermic reduction tower through a high-temperature cyclone separator, most of the separated carbon-based reducing agent is returned to the reduction tower to continue to serve as a reducing medium, and the other small part of the carbon-based reducing agent that loses the reducing property is discharged to the conditioner to react with oxygen in the flue gas so as to remove oxygen from the flue gas;

3) The reaction gas separated by the high temperature separator is 800□ and condensed to 400□ in a reaction gas cooler, the condensed reaction gas is introduced into a dust filter for secondary gas-solid separation to ensure the quality of sulfur recovery, the filtered reaction gas is condensed in a sulfur collection device to collect sulfur and the sulfur is stored in a sulfur storage tank;

4) The flue gas from a pyro-refining anode furnace, which is about 1100□ and has a $SO_2$ concentration of less than 5%, is cooled to 70□ by a second flue gas cooler and then mixed with the reaction gas after sulfur condensation recovery in the sulfur collection device, the temperature of the mixed flue gas is 100□, and the mixed flue gas is introduced into an active coke desulfurization tower, subjected to dust removal in a dust collector and discharged through a chimney;

5) The saturated active coke in the active coke desulfurization tower is fed into a desorption tower, where the desorption temperature is about 400□, and the $SO_2$ concentration in the desorbed gas is about 20%; and then the desorbed gas is introduced into the fluidized bed carbothermic reduction tower for oxidation-reduction reaction with the carbon-based reducing agent therein to recover sulfur.

Embodiment 2

1) Flue gas from a matte smelting furnace and a matte converting furnace is about 1200° C., with the $SO_2$ concentration of 15%, dust is removed first from high-concentration $SO_2$ flue gas from the matte smelting furnace in a settling chamber, the flue gas after dust removal is mixed with high-concentration $SO_2$ flue gas from the matte converting furnace, then the mixed flue gas is introduced into a conditioner, the temperature of the conditioned flue gas rises to 1200° C., the conditioned flue gas is introduced into a dust removal device to remove dust carried in the flue gas and then introduced into a first flue gas cooler for temperature control, and the flue gas cooler controls the temperature of the flue gas to 800□;

2) The flue gas after temperature control in the flue gas cooler is introduced into a fluidized bed carbothermic reduction tower for oxidation-reduction reaction with a carbon-based reducing agent, where the reaction temperature is 900°C, the carbon-based reducing agent has a particle size of 100 μm, the molar ratio of C/SO$_2$ is 60, the gas velocity in the tower is 5 meters, and the gas-solid contact time in the tower is 5 s; primary gas-solid separation is performed first on the reaction gas obtained in the fluidized bed carbothermic reduction tower through a high-temperature cyclone separator, most of the separated carbon-based reducing agent is returned to the reduction tower to continue to serve as a reducing medium, and the other small part of the carbon-based reducing agent that loses the reducing property is discharged to the conditioner to react with oxygen in the flue gas so as to remove oxygen from the flue gas;

3) The reaction gas separated by the high temperature separator is 850°C and condensed to 500°C in a reaction gas cooler, the condensed reaction gas is introduced into a dust filter for secondary gas-solid separation to ensure the quality of sulfur recovery, the filtered reaction gas is condensed in a sulfur collection device to collect sulfur and the sulfur is stored in a sulfur storage tank;

4) The flue gas from a pyro-refining anode furnace, which is about 1200°C and has a SO$_2$ concentration of less than 5%, is cooled to 80°C by a second flue gas cooler and then mixed with the reaction gas after sulfur condensation recovery in the sulfur collection device, the temperature of the mixed flue gas is 110°C, and the mixed flue gas is introduced into an active coke desulfurization tower, subjected to dust removal in a dust collector and discharged through a chimney;

5) The saturated active coke in the active coke desulfurization tower is fed into a desorption tower, where the desorption temperature is about 400°C, and the SO$_2$ concentration in the desorbed gas is about 25%; and then the desorbed gas is introduced into the fluidized bed carbothermic reduction tower for oxidation-reduction reaction with the carbon-based reducing agent therein to recover sulfur.

Embodiment 3

1) Flue gas from a matte smelting furnace and a matte converting furnace is about 1300° C., with the SO$_2$ concentration of 20%, dust is removed first from high-concentration SO$_2$ flue gas from the matte smelting furnace in a settling chamber, the flue gas after dust removal is mixed with high-concentration SO$_2$ flue gas from the matte converting furnace, then the mixed flue gas is introduced into a conditioner, the temperature of the conditioned flue gas rises to 1300° C., the conditioned flue gas is introduced into a dust removal device to remove dust carried in the flue gas and then introduced into a first flue gas cooler for temperature control, and the flue gas cooler controls the temperature of the flue gas to 800°C;

2) The flue gas after temperature control in the flue gas cooler is introduced into a fluidized bed carbothermic reduction tower for oxidation-reduction reaction with a carbon-based reducing agent, where the reaction temperature is 950°C, the carbon-based reducing agent has a particle size of 150 μm, the molar ratio of C to SO$_2$ is 60, the gas velocity in the tower is 5 meters, and the gas-solid contact time in the tower is 6 s; primary gas-solid separation is performed first on the reaction gas obtained in the fluidized bed carbothermic reduction tower through a high-temperature cyclone separator, most of the separated carbon-based reducing agent is returned to the reduction tower to continue to serve as a reducing medium, and the other small part of the carbon-based reducing agent that loses the reducing property is discharged to the conditioner to react with oxygen in the flue gas so as to remove oxygen from the flue gas;

3) The reaction gas separated by the high temperature separator is 900°C and condensed to 600°C in a reaction gas cooler, the condensed reaction gas is introduced into a dust filter for secondary gas-solid separation to ensure the quality of sulfur recovery, the filtered reaction gas is condensed in a sulfur collection device to collect sulfur and the sulfur is stored in a sulfur storage tank;

4) The flue gas from a pyro-refining anode furnace, which is about 1300°C and has a SO$_2$ concentration of less than 5%, is cooled to 90°C by a second flue gas cooler and then mixed with the reaction gas after sulfur condensation recovery in the sulfur collection device, the temperature of the mixed flue gas is 120°C, and the mixed flue gas is introduced into an active coke desulfurization tower, subjected to dust removal in a dust collector and discharged through a chimney;

5) The saturated active coke in the active coke desulfurization tower is fed into a desorption tower, where the desorption temperature is about 400°C, and the SO$_2$ concentration in the desorbed gas is about 30%; and then the desorbed gas is introduced into the fluidized bed carbothermic reduction tower for oxidation-reduction reaction with the carbon-based reducing agent therein to recover sulfur.

As shown in FIG. 1, a system for recovering sulfur in a copper smelting process includes a proportioning bin 1, a dryer 2, a matte smelting furnace 3, a settling chamber 4, an electric furnace 5, a matte converting furnace 6, a slow ash cooler 7, a pyro-refining anode furnace 8, a conditioner 9, a dust collector 10, a first flue gas cooler 11, a fluidized bed carbothermic reduction tower 12, a feed hopper 13, a high temperature separator 14, a reducing gas cooler 15, a fine dust filter 16, a sulfur recovery device 17, a sulfur storage tank 18, a desulfurization tower 19, a dust collector 20, a chimney 21, a desorption tower 22, a nitrogen making machine 23, and a second flue gas cooler 24; the bottom of the proportioning bin 1 is connected to the dryer 2, the dryer 2 is connected to the matte smelting furnace 3 by a conveyor belt, the lower part of the matte smelting furnace 3 is connected to the settling chamber 4, and a solid outlet of the settling chamber 4 is connected to the electric furnace 5, the slow ash cooler 7, and the matte converting furnace 6 respectively; the matte converting furnace 6 is connected to the slow ash cooler 7 by a pipe and connected to the pyro-refining anode furnace 8 by a crude copper conveyor belt, the flue gas passing through the flue gas pipe is mixed with the flue gas passing through the settling chamber 4 and then the mixed flue gas sequentially passes through the conditioner 9, the first dust collector 10 and the first flue gas cooler 11; the flue gas from the first flue gas cooler 11 and the flue gas from the desorption tower 22 are mixed and then introduced into the fluidized bed carbothermic reduction tower 12, and the reaction gas from the fluidized bed carbothermic reduction tower 12 is sequentially introduced into the high temperature separator 14, the reducing gas cooler 15, the fine dust filter 16, and the sulfur recovery device 17; the condensed sulfur in the sulfur recovery device 17 is fed into the sulfur storage tank 18, the flue gas from the pyro-refining anode furnace 8 is introduced into the second flue gas cooler 24, mixed with the reaction gas at the outlet of the sulfur recovery device 17 and then connected to the active coke desulfurization tower 19, the second dust collector 20 and the chimney 21 in sequence; and the saturated powder coke at the bottom of the active coke desulfurization tower 19 is delivered to the desorption tower 22 by the conveyor belt.

The matte smelting furnace 3 introduces oxygen and air through pipes;

Copper matte discharged from the electric furnace 5 is introduced into an outside blowing device, and the electric furnace 5 discharges waste residue;

Copper matte discharged from the settling chamber 4 is introduced into the matte converting furnace 6, and the slag discharged from the matte converting furnace 6 and the settling chamber 4 is introduced into the slow ash cooler 7; the ash discharged from the slow ash cooler 7 enters the subsequent ore grinding and flotation processes.

The product discharged from the pyro-refining anode furnace 8 enters a subsequent electrolytic refining process to obtain finished anode copper.

High $SO_2$ concentration flue gas discharged from the settling chamber 4 and high $SO_2$ concentration flue gas discharged from the pyro-refining anode furnace 8 are mixed and then introduced into the conditioner 9, and the high temperature flue gas from the conditioner 9 sequentially enters the first dust collector 10, the first flue gas cooler 11, and the fluidized bed carbothermic reduction tower 12. A buffer tank 25 is arranged at the bottom of the fluidized bed carbothermic reduction tower 12, and a fluidizing air nozzle is arranged inside the buffer tank 25; an ash hopper 27 and a coke storage tank 26 are sequentially connected below the high temperature separator 14; one side of the buffer tank 25 is connected to the feed hopper, the other side is connected to the coke storage tank 26 below the high temperature separator 14, and the fluidizing air nozzle 28 is lower than feed ports on two sides of the buffer tank 25; and an aeration air nozzle 29 is arranged in the coke storage tank 26.

Exhausted coke from the coke drum 26 is introduced into the conditioner 9 as a reducing medium for absorbing oxygen in the flue gas.

The desorption tower 22 is divided into three sections, respectively a drying and preheating section, a desorption section and a cooling section, a gas discharge device is arranged above each section, the cooling section is divided into an upper cooling section and a lower cooling section, the gas discharge devices are sequentially a first-layer gas discharge device, a second-layer gas discharge device and a third-layer gas discharge device from top to bottom, the nitrogen making machine 23 is connected with a heat transfer medium header outside the drying and preheating section and the upper cooling section of the desorption tower 22, the third-layer gas discharge device is connected to the second-layer gas discharge device, and the desorbed gas discharged by the second-layer gas discharge device and the flue gas from the first flue gas cooler 11 are mixed and then introduced to the bottom of the fluidized bed carbothermic reduction tower 12.

The heat transfer medium header at the lower cooling section introduces air or cooling water as a cooling medium; the heat transfer medium header at the desorption section introduces heat transfer medium air in the second flue gas cooler as a heating medium at the desorption section, and the air heating medium after heat transfer is introduced into the second flue gas cooler; the cooled powder coke after desorption at the bottom of the desorption tower is delivered to the fluidized bed carbothermic reduction tower; the low-concentration $SO_2$ gas desorbed by the active coke and discharged by the first gas discharge device enters the desulfurization tower, and the high-concentration $SO_2$ gas discharged by the second gas discharge device is discharged to the fluidized bed carbothermic reduction tower.

In Embodiment 1, the conversion rate of $SO_2$ is 98%, the yield of sulfur is 95%, and the purity of recovered sulfur is 99.7%; in Embodiment 2, the conversion rate of $SO_2$ is 95%, the yield of sulfur is 93%, and the purity of recovered sulfur is 99%; in Embodiment 3, the conversion rate of $SO_2$ is 94%, the yield of sulfur is 92%, and the purity of recovered sulfur is 99.1%.

Described above are merely preferred embodiments of the present application, and the present application is not limited thereto. Various modifications and variations may be made to the present application for those skilled in the art. Any modification, equivalent substitution, improvement or the like made within the spirit and principle of the present application shall fall into the protection scope of the present application.

The invention claimed is:

1. A method for recovering sulfur in a copper smelting process, comprising the steps of:
   1) removing dust first from high-concentration $SO_2$ flue gas from a matte smelting furnace in a settling chamber, mixing the flue gas after dust removal with high-concentration $SO_2$ flue gas from a matte converting furnace, then introducing the mixed flue gas into a conditioner, introducing the conditioned flue gas into a dust removal device to remove dust carried in the flue gas, and then introducing the flue gas into a first flue gas cooler for temperature control;
   2) introducing the flue gas after temperature control in the first flue gas cooler into a fluidized bed carbothermic reduction tower for oxidation-reduction reaction with a carbon-based material, performing primary gas-solid separation on the reaction gas obtained in the fluidized bed carbothermic reduction tower through a high temperature separator, returning most of the separated carbon-based reducing agent to the reduction tower to continue to serve as a reducing medium, and discharging the other small part of the carbon-based reducing agent that loses the reducing property to the conditioner to react with oxygen in the flue gas so as to remove oxygen from the flue gas;
   3) condensing the reaction gas separated by the high temperature separator in a reducing gas cooler, introducing the condensed reaction gas into a dust filter for secondary gas-solid separation to ensure the quality of sulfur recovery, condensing the filtered reaction gas in a sulfur collection device to collect sulfur and storing the sulfur in a sulfur storage tank;
   4) cooling the flue gas from a pyro-refining anode furnace first by a second flue gas cooler, then mixing with the reaction gas after sulfur condensation recovery in the sulfur collection device, introducing the mixed flue gas into an active coke desulfurization tower, then removing dust in the dust removal device, and discharging the flue gas through a chimney; and
   5) feeding the saturated active coke in the active coke desulfurization tower into a desorption tower, and then introducing the desorbed gas into the fluidized bed carbothermic reduction tower for oxidation-reduction reaction with the carbon-based reducing agent therein to recover sulfur.

2. The method according to claim 1, wherein in step 1), the flue gas from the matte smelting furnace and the matte converting furnace is 1000-1400° C., with the $SO_2$ concentration of 5-30%; the flue gas at the outlet of the conditioner is 1000-1500° C.; and the flue gas at the outlet of the first flue gas cooler is 700-1000° C.

3. The method according to claim 1, wherein in step 2), the temperature of reaction between the flue gas and the carbon-based reducing agent in the fluidized bed carbothermic reduction tower is 700-1000° C., the molar ratio of the carbon-based reducing agent to the $SO_2$ is 10-100, the gas velocity in the tower is 4-8 m/s, and the gas-solid contact time in the tower is 2-12 s.

4. The method according to claim 3, wherein the gas-solid contact time in the tower is 3-6 s, and the molar ratio of the carbon-based reducing agent to the $SO_2$ is 50-100.

5. The method according to claim 1, wherein in step 2), the carbon-based reducing agent has a particle diameter of 60 μm to 3 mm.

6. The method according to claim 5, wherein the reaction gas obtained after reduction in the fluidized bed carbothermic reduction tower is a mixture including any of $N_2$, $SO_2$, COS, $H_2S$, $CS_2$, CO, $H_2$, or $CO_2$.

7. The method according to claim 5, wherein the carbon-based reducing agent has a particle diameter of 60 μm to 1 mm.

8. The method according to claim 1, wherein in step 3), the reaction gas separated by the high temperature separator at about 700-1000° C. is condensed in the reducing gas cooler, and the temperature of the condensed reaction gas is 300-600° C.

9. The method according to claim 8, wherein in step 5), the desorbed gas discharged from the desorption tower is 300-600° C., and the $SO_2$ concentration of the desorbed gas is 10-40%.

10. The method according to claim 9, wherein the desorbed gas is a mixture including any of $N_2$, $SO_2$, $H_2O$, or $CO_2$.

11. The method according to claim 1, wherein in step 4), the flue gas from the pyro-refining anode furnace is about 1000-1400° C., with the $SO_2$ concentration of less than 5%; the flue gas from the pyro-refining anode furnace is cooled to 50-130° C. by the second flue gas cooler; and the mixed flue gas is 80-160° C.

12. A system for recovering sulfur in a copper smelting process, comprising a proportioning bin, a dryer, a matte smelting furnace, a settling chamber, an electric furnace, a matte converting furnace, a slow ash cooler, a pyro-refining anode furnace, a conditioner, a dust removal device, a first flue gas cooler, a fluidized bed carbothermic reduction tower, a feed hopper, a high temperature separator, a reducing gas cooler, a fine dust filter, a sulfur recovery device, a sulfur storage tank, a desulfurization tower, a dust collector, a chimney, a desorption tower, a nitrogen making machine, and a second flue gas cooler, wherein the bottom of the proportioning bin is connected to the dryer, the dryer is connected to the matte smelting furnace by a conveyor belt, the lower part of the matte smelting furnace is connected to the settling chamber, and a solid outlet of the settling chamber is connected to the electric furnace, the slow ash cooler, and the matte converting furnace respectively; the matte converting furnace is connected to the slow ash cooler by a pipe and connected to the pyro-refining anode furnace by a crude copper conveyor belt, the flue gas passing through the flue gas pipe is mixed with the flue gas passing through the settling chamber and then the mixed flue gas sequentially passes through the conditioner, the first dust removal device and the first flue gas cooler; the flue gas from the first flue gas cooler and the flue gas from the desorption tower are mixed and then introduced into the fluidized bed carbothermic reduction tower, and the reaction gas from the fluidized bed carbothermic reduction tower is sequentially introduced into the high temperature separator, the reducing gas cooler, the fine dust filter, and the sulfur recovery device; the condensed sulfur in the sulfur recovery device is fed into the sulfur storage tank, the flue gas from the pyro-refining anode furnace is introduced into the second flue gas cooler, mixed with the reaction gas at the outlet of the sulfur recovery device and then introduced into the active coke desulfurization tower, dust is removed in the second dust removal device, and the flue gas is discharged through the chimney; and the saturated powder coke at the bottom of the active coke desulfurization tower is delivered to the desorption tower by the conveyor belt.

13. The system according to claim 12, wherein a buffer tank is arranged at the bottom of the fluidized bed carbothermic reduction tower, and a fluidizing air nozzle is arranged inside the buffer tank; an ash hopper and a coke storage tank are sequentially connected below the high temperature separator; one side of the buffer tank is connected to the feed hopper, the other side is connected to the coke storage tank below the high temperature separator, and the fluidizing air nozzle is lower than feed ports on two sides of the buffer tank; and an aeration air nozzle is arranged in the coke storage tank.

14. The system according to claim 12, wherein the desorption tower is divided into three sections from top to bottom, respectively a drying and preheating section, a desorption section and a cooling section, a gas discharge device is arranged above each section, the cooling section is divided into an upper cooling section and a lower cooling section, the nitrogen making machine is connected with a heat transfer medium header outside the drying and preheating section and the upper cooling section of the desorption tower, the gas discharge devices are sequentially a first-layer gas discharge device, a second-layer gas discharge device and a third-layer gas discharge device from top to bottom, the third-layer gas discharge device is connected to the second-layer gas discharge device, and the desorbed gas discharged by the second-layer gas discharge device and the flue gas from the first flue gas cooler are mixed and then introduced to the bottom of the fluidized bed carbothermic reduction tower.

\* \* \* \* \*